United States Patent [19]
Glevicky et al.

[11] Patent Number: 5,197,289
[45] Date of Patent: Mar. 30, 1993

[54] DOUBLE DOME COMBUSTOR

[75] Inventors: Mark M. Glevicky; Hubert S. Roberts, Jr.; Steven C. Steffens; Kevin W. Pendery, all of Cincinnati, Ohio

[73] Assignee: General Electric Company, Cincinnati, Ohio

[21] Appl. No.: 617,760

[22] Filed: Nov. 26, 1990

[51] Int. Cl.⁵ .............................................. F02C 01/00
[52] U.S. Cl. ..................................... 60/746; 60/752
[58] Field of Search ............... 60/733, 746, 747, 748, 60/752, 39.36

[56] References Cited

U.S. PATENT DOCUMENTS

| | | | |
|---|---|---|---|
| 2,686,401 | 8/1954 | Newcomb | 60/747 |
| 2,801,520 | 8/1957 | Highberg | 60/747 |
| 2,852,914 | 9/1958 | Robin et al. | |
| 3,132,483 | 5/1964 | Lefebvre et al. | |
| 3,273,343 | 9/1966 | Cretella | |
| 3,714,778 | 2/1973 | Howald | 60/746 |
| 4,195,475 | 4/1980 | Verdouw | 60/757 |
| 4,246,758 | 1/1981 | Caruel et al. | 60/747 |
| 4,249,373 | 2/1981 | Sotheran et al. | 60/39.36 |
| 4,253,301 | 3/1981 | Vogt | 60/746 |
| 4,305,255 | 12/1981 | Davies et al. | 60/746 |
| 4,365,477 | 12/1982 | Pearce | 60/747 |
| 4,763,482 | 8/1988 | Wehner | 60/746 |
| 4,903,492 | 2/1990 | King | 60/733 |

FOREIGN PATENT DOCUMENTS

| | | | |
|---|---|---|---|
| 1377988 | 9/1964 | France | 60/747 |
| 0510724 | 6/1955 | Italy | 60/746 |
| 0260957 | 8/1949 | Switzerland | |
| 2010408 | 6/1979 | United Kingdom | |
| 2672827 | 10/1981 | United Kingdom | 60/746 |

OTHER PUBLICATIONS

Burrus et al., Energy Efficient Engine, Combustion System Component Technology Development Report, NASA Report R82AEB401, Nov. 1982, pp. cover, title, 1-3, 7, 16, 47-50, and 81-87.

Primary Examiner—Richard A. Bertsch
Assistant Examiner—Michael I. Kocharov
Attorney, Agent, or Firm—Jerome C. Squillaro; James P. Davidson

[57] ABSTRACT

A double dome combustor for a gas turbine engine includes first and second domes joined to outer and inner liners. The first and second domes are joined together by two load transmitting structural paths for providing increased rigidity of the first and second domes for accommodating pressure loading from compressed airflow. In one exemplary embodiment, a dome cowl having first and second cowls is used to additionally join together the first and second domes.

24 Claims, 10 Drawing Sheets

DOUBLE DOME COMBUSTOR

TECHNICAL FIELD

The present invention relates generally to gas turbine engine combustors, and, more specifically, to a double dome combustor.

BACKGROUND ART

Combustors used in gas turbine engines, for example, those engines used for powering aircraft, typically include sheet metal combustion liners and sheet metal combustion dome assemblies. The combustor is provided with pressurized, compressed airflow from the gas turbine engine compressor and is, therefore, subject to pressure loading from the compressed airflow which will deform and buckle the combustor unless suitable stiffening structural support is provided to the combustor.

Furthermore, the compressor includes circumferentially spaced rotor blades which provide the compressed airflow with pressure pulses. Accordingly, the combustor must also be configured for accommodating these pressure pulses for providing acceptable vibratory life.

A typical gas turbine engine combustor includes a single annular dome having a plurality of circumferentially spaced carburetors which provide a fuel/air mixture into the combustor. Each of the carburetors includes a conventional fuel injector for providing fuel, and a conventional typically counterrotational swirler which provides swirled air for mixing with the fuel. Such single dome combustors have a relatively high length-to-height ratio for obtaining, for example, acceptable mixing of the combustor gases for generally uniform combustor exit temperatures. In order to reduce the length-to-height ratio for reducing weight and exhaust emissions, including for example $NO_x$ emissions, double dome annular combustors are being considered.

A double dome annular combustor includes radially outer and inner domes each including a respective plurality of circumferentially spaced carburetors. Each of the domes has a respective combustion zone extending downstream therefrom, each having a respective length-to-height ratio which is generally equal to length-to-height ratios of conventional single dome combustors. However, the overall length of the double dome combustor may be made substantially smaller than the length of a single dome combustor since the two combustion zones operate in parallel.

Since a double dome combustor has two radially extending domes which typically have an increased surface area the domes are subject to relatively high pressure loading from the pressurized compressed airflow provided from the compressor. For example, in one design application, the resultant axial pressure loading acting upon the double domes of an exemplary combustor is on the order of 20,000 pounds (about 9,100 kilograms) which is a substantial amount of loading which must be accommodated by the combustor without unacceptable distortion, buckling, or HCF life.

OBJECTS OF THE INVENTION

Accordingly, one object of the present invention is to provide a new and improved combustor for a gas turbine engine.

Another object of the present invention is to provide a new and improved double dome combustor having increased dome rigidity for accommodating pressure loading from compressed airflow.

Another object of the present invention is to provide a double dome combustor having relatively few components.

Another object of the present invention is to provide a double dome combustor having improved high cycle fatigue life.

DISCLOSURE OF INVENTION

A double dome combustor for a gas turbine engine includes first and second domes joined to outer and inner liners. Means are provided for joining together the first and second domes by two load transmitting structural paths for providing rigidity of the first and second domes for accommodating pressure loading from compressed airflow. In one exemplary embodiment, the joining means include the first and second domes being fixedly joined together, and a dome cowl having first and second cowls additionally joining the first and second domes together.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
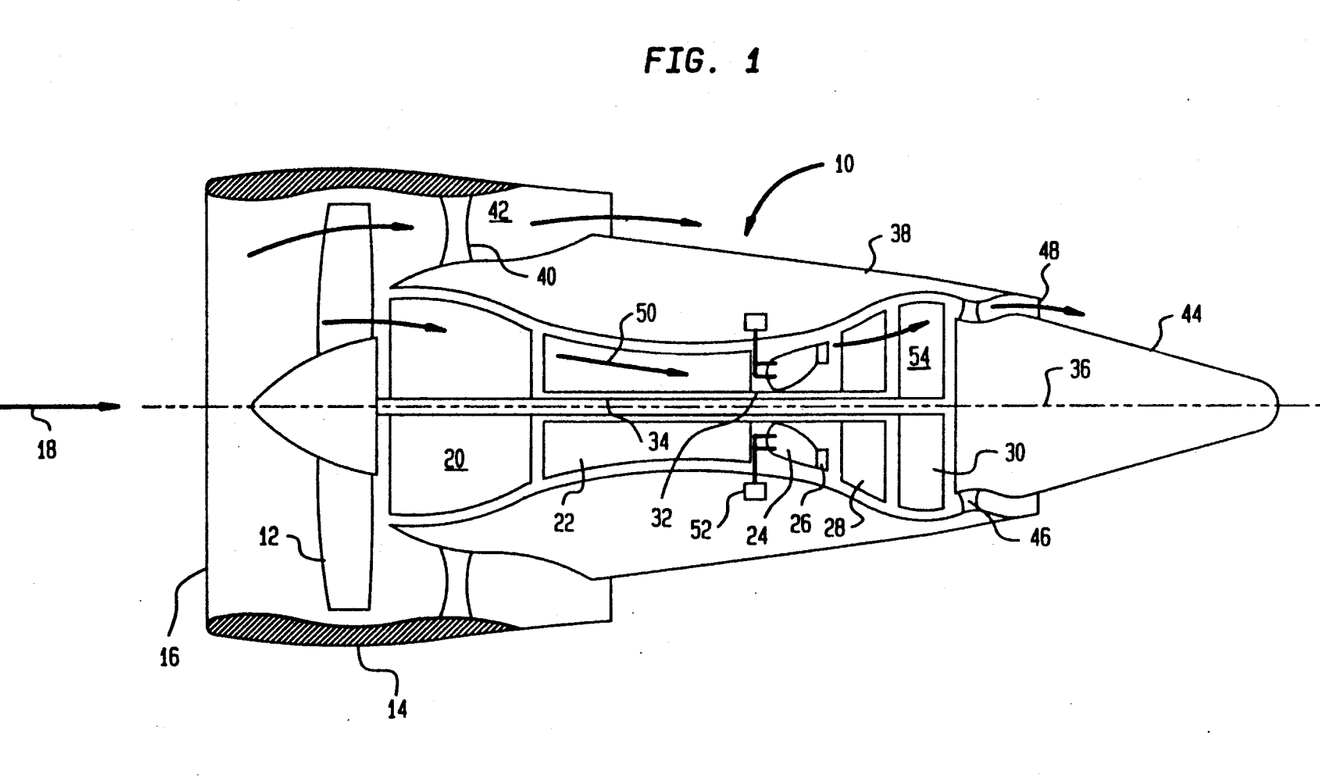
FIG. 1 is a longitudinal centerline schematic sectional view of a high bypass turbofan engine including a combustor in accordance with one embodiment of the present invention.

Illustrated in FIG. 1 is a longitudinal sectional schematic view of a high bypass turbofan engine 10. The engine 10 includes a conventional fan 12 disposed inside a fan cowl 14 having an inlet 16 for receiving ambient airflow 18. Disposed downstream of the fan 12 is a conventional low pressure compressor (LPC) 20 followed in serial flow communication by a conventional high pressure compressor (HPC) 22, a combustor 24 in accordance with one embodiment of the present invention, a conventional high pressure turbine nozzle 26, a conventional high pressure turbine (HPT) 28, and a conventional low pressure turbine (LPT) 30.

The HPT 28 is conventionally fixedly connected to the HPC 22 by an HP shaft 32, and the LPT 30 is conventionally connected to the LPC 20 by a conventional LP shaft 34. The LP shaft 34 is also conventionally fixedly connected to the fan 12. The engine 10 is symmetrical about a longitudinal centerline axis 36 disposed coaxially with the HP and LP shafts 32 and 34.

The fan cowl 14 is conventionally fixedly attached to and spaced from an outer casing 38 by a plurality of circumferentially spaced conventional struts 40 defining therebetween a conventional annular fan bypass duct 42. The outer casing 38 surrounds the engine 10 from the LPC 20 to the LPT 30. A conventional exhaust cone 44 is spaced radially inwardly from the casing 38 and downstream from the LPT 30, and is fixedly connected thereto by a plurality of conventional circumferentially spaced frame struts 46 to define an annular core outlet 48 of the engine 10.

During operation, the airflow 18 is compressed in turn by the LPC 20 and HPC 22 and is then provided as pressurized compressed airflow 50 to the combustor 24. Conventional fuel injection means 52 provide fuel to the combustor 24 which is mixed with the compressed airflow 50 and undergoes combustion in the combustor 24 for generating combustion discharge gases 54. The gases 54 flow in turn through the HPT 28 and the LPT 30 wherein energy is extracted for rotating the HP and LP shafts 32 and 34 for driving the HPC 22, and the LPC 20 and fan 12, respectively.

Figure 2:
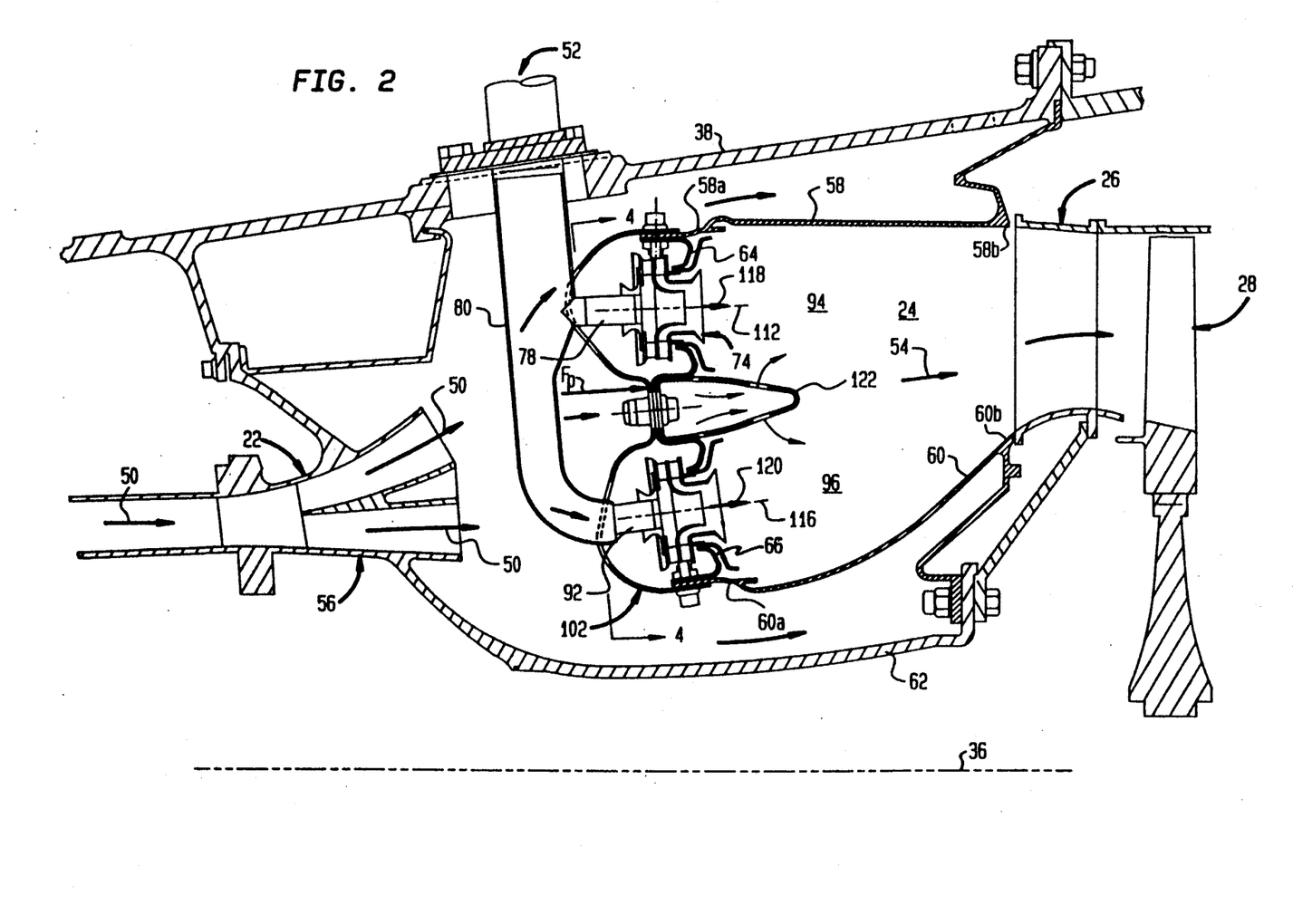
FIG. 2 is an enlarged longitudinal sectional view of the combustor illustrated in FIG. 1, including adjacent structures.

Illustrated in FIG. 2 is a longitudinal sectional view of the combustor 24. Disposed upstream of the combustor 24 is a conventional diffuser 56 which reduces the velocity of the compressed airflow 50 received from the HPC 22 for increasing its pressure and channeling the pressurized airflow 50 to the combustor 24.

The combustor 24 includes annular outer and inner liners 58 and 60, respectively, disposed coaxially about the centerline axis 36. Each of the liners 58 and 60 includes an upstream end 58a and 60a, respectively, and a downstream end 58b and 60b, respectively. The downstream ends 58b and 60b are conventionally fixedly connected to the outer casing 38 and an inner casing 62, respectively, by being clamped thereto using conventional bolts. By this arrangement, the combustor 24 is supported solely at the outer and inner liner downstream ends 58b and 60b with the upstream ends 58a and 60a being freely supported.

The combustor 24 in accordance with the present invention, includes a radially outer, annular, first, or pilot, dome 64, and a radially inner, annular, second, or main, dome 66 disposed generally radially inwardly of the first dome 64.

Figure 3:
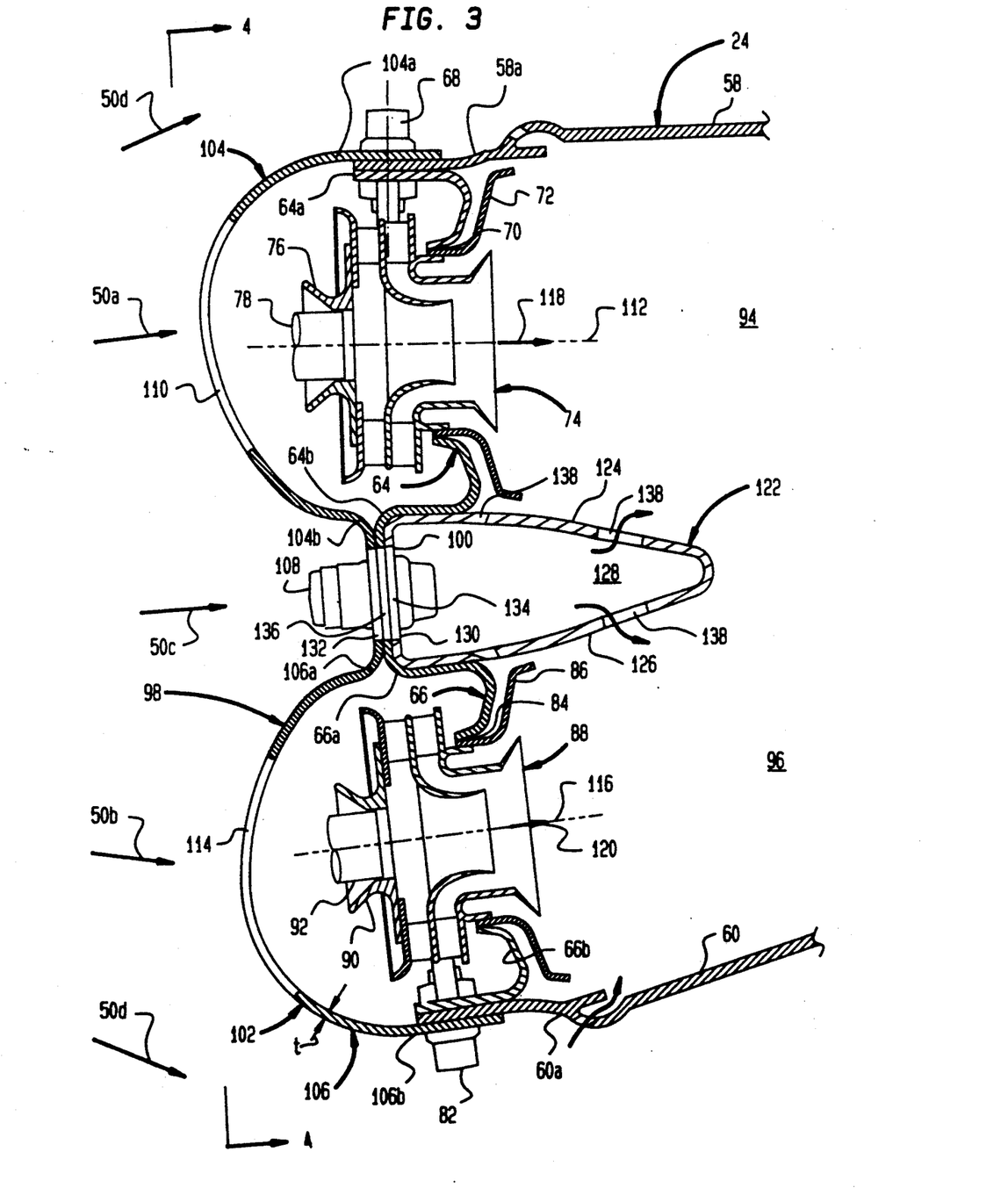
FIG. 3 is an enlarged longitudinal sectional view of the upstream end of the combustor illustrated in FIG. 2 in accordance with the preferred embodiment of the present invention, and is a sectional view along line 3—3 of FIG. 4.

FIG. 3 illustrates in more particularity the upstream end of the combustor 24. The first dome 64 includes an annular radially outer end or edge 64a which is conventionally fixedly joined to the outer liner upstream end 58a by a plurality of circumferentially spaced conventional bolts 68, including mating nuts. The first dome 64 also includes an annular radially inner end or edge 64b which is spaced radially inwardly from the outer end 64a. A plurality of circumferentially spaced first holes 70 are disposed in the first dome 64 each receiving a conventional first annular baffle 72 fixedly joined thereto by brazing, for example. A plurality of conventional first carburetors 74 are disposed in respective ones of the first holes 70.

More specifically, each of the first carburetors 74 includes a conventional counterrotational dome cup, or swirler 76 fixedly joined to the first dome in flow communication with the dome first hole 70 by being brazed, for example, to the first baffle 72. Each first carburetor 74 also includes a conventional first fuel injector 78 conventionally slidably disposed in the first swirler 76 and integrally joined to a fuel stem 80 of the fuel injection means 52 (see FIG. 2).

The second dome 66 is spaced radially inwardly from the first dome 64 and includes an annular radially outer end or edge 66a, and an annular radially inner end or edge 66b spaced radially inwardly from the second dome outer end 66a. The second dome inner end 66b is conventionally fixedly joined to the inner liner upstream end 60a by a plurality of circumferentially spaced bolts 82. The second dome 66 also includes a plurality of circumferentially spaced second holes 84 disposed therein for receiving a conventional annular second baffle 86, which is fixedly secured therein by brazing, for example. A plurality of conventional second carburetors 88 are disposed in flow communication with respective ones of the dome second holes 84, each carburetor 88 including a conventional counterrotational second dome cup, or swirler 90 fixedly joined to the second dome 66 by being brazed, for example, to the second baffle 86. Each of the second carburetors 88 also includes a conventional second fuel injector 92 slidably disposed in the second swirler 90 and extending integrally from the fuel stem 80 (see FIG. 2).

The inner liner 60 is spaced radially inwardly from the outer liner 58 to define therebetween first and second combustion zones 94 and 96 extending downstream from the first and second domes 64 and 66, respectively.

In accordance with the present invention, means, indicated generally at 98, are provided for joining together the first dome 64 and the second dome 66 for providing axial, or longitudinal structural rigidity of the first and second domes 64 and 66 for accommodating pressure loading from the compressed airflow 50. As illustrated in FIG. 2, the compressed airflow 50 discharged from the diffuser 56 acts against the upstream surfaces of the first and second domes 64 and 66 creating a pressure loading indicated schematically by the resultant pressure force $F_p$. In one design application of the combustor 24, the pressure force $F_p$ acting on the first and second domes 64 and 66 is about 20,000 pounds (9,100 kg). This is a substantial amount of pressure force which must be accommodated by the combustor 24, and in particular the first and second domes 64 and 66, without unacceptable bending deformation or HCF life. In the exemplary embodiment illustrated in FIG. 2, the combustor 24 is aft-mounted at the downstream ends 58b and 60b of the outer and inner liners, and, therefore, no support is provided at the forward end of the combustor 24 which could be used in this embodiment for partly accommodating the pressure loads $F_p$.

In order to increase the structural, or bending, rigidity of the first and second domes 64 and 66, the joining means 98 includes a first structural path wherein the first dome inner end 64b, as illustrated in FIG. 3, for example, is fixedly connected to the second dome outer end 66a to define a mid-dome support 100. In this embodiment, the first and second domes 64 and 66 comprise an integral, single member with the intersection therebetween defining the mid-dome support 100 which rigidly connects together the first and second domes 64 and 66. A second structural path 102 also fixedly joins together the first and second domes 64 and 66 and is spaced at least in part from the first structural path (100). Accordingly, by providing two structural paths between the first and second domes 64 and 66 spaced at least in part from each other, the rigidity of the first and second domes 64 and 66 between the outer and inner liners 58 and 60 in the longitudinal direction is therefore increased for better accommodating the pressure force $F_p$ without unacceptable bending deformation.

In the exemplary embodiment of the present invention illustrated in FIGS. 2 and 3, for example, the joining means second structural path 102 preferably includes an annular dome cowl, also designated 102, disposed upstream of the first and second domes 64 and 66.

More specifically, the dome cowl 102 includes an annular, radially outer first cowl, or portion, 104 disposed coaxially about the engine centerline 36 and upstream of the first dome 64. The first cowl 104 includes a radially outer end 104a fixedly joined to the first dome outer end 64a by the bolts 68, and a radially inner end 104b spaced radially inwardly from the first cowl outer end 104a and fixedly joined to the mid-dome support 100.

The dome cowl 102 also includes an annular, radially inner second cowl, or portion, 106 disposed coaxially about the engine centerline 36 and upstream of the second dome 66. The second cowl 106 includes a radially outer end 106a fixedly joined to the mid-dome support 100, and a radially inner end 106b spaced radially inwardly from the cowl outer end 106a and fixedly joined to the second dome inner end 66b by the bolts 82. In the preferred embodiment, the first and second cowls 104 and 106 are preferably integral with each other, and the dome cowl 102 is an integral cast member with a substantially uniform thickness t which is greater than the thickness of conventional sheet metal typically utilized in combustors for increasing the structural rigidity of the dome cowl 102. To further increase the structural rigidity of the dome cowl 102, the first and second cowls 104 and 106 are generally arcuate in longitudinal section for increasing the conventionally known moment of inertia thereof. In the preferred embodiment, each of the first and second cowls 104 and 106 is generally convex in an upstream facing direction for increasing rigidity and providing an aerodynamically contoured dome cowl 102 for preferred channeling of the compressed airflow 50 into and over the combustor 24.

The dome cowl 102 is, accordingly, a generally W-shaped member in longitudinal section which is fixedly joined to the first and second domes 64 and 66 at the first cowl outer end 104a and the second cowl inner end 104b, and at the mid-dome support 100 by a plurality of circumferentially spaced conventional bolts 108. The bolts 108 fixedly connect the first cowl inner end 104b and the second cowl outer end 106a to the mid-dome support 100 defined at the first and second dome inner and outer ends 64b and 66a, respectively. Accordingly, the dome cowl 102 in accordance with the present invention provides the second structural path for carrying a portion of the load from the pressure force $F_p$ acting on the first and second domes 64 and 66 to the outer and inner liners 58 and 60, and in turn to the outer and inner casings 38 and 62, respectively. The remaining portion of the load from the pressure force $F_p$ is carried through the first and second domes 64 and 66 to the outer and inner liners 58 and 60.

The dome cowl 102 further includes a plurality of circumferentially spaced first inlets or holes 110 for receiving a first portion 50a of the compressed airflow 50, with each inlet 110 being aligned axially with a respective one of the first dome holes 70 and first carburetors 74 to about a first carburetor axial centerline axis 112. The second cowl 106 includes a plurality of circumferentially spaced second inlets, or holes, 114 for receiving a second portion 50b of the compressed airflow 50, with each inlet 114 being aligned axially with a respective one of the second dome holes 84 and second carburetors 88 about a second carburetor axial centerline axis 116.

The first carburetors 74 receive fuel from the first fuel injector 78 and the compressed air first portion 50a for providing a first fuel/air mixture 118 into the first combustion zone 94. Each of the second carburetors 88 receives fuel from the second fuel injectors 92 and the compressed airflow second portion 50b for providing a second fuel/air mixture 120 into the second combustion zone 96.

As illustrated in FIG. 2, the first fuel/air mixture 118 is conventionally ignited in the first combustion, or pilot, zone 94 which in turn ignites the second fuel/air mixture 120 in the second, or main, combustion zone 96 which converges toward the first combustion zone 94 for collectively generating the combustion gases 54.

For further defining the first and second combustion zones 94 and 96 and for further providing structural rigidity, the joining means 98 further include an annular centerbody 122 which is fixedly joined to the first and second domes 64 and 66 at the mid-dome support 100, as illustrated in more particularity in FIG. 3.

The centerbody 122 is preferably hollow and includes an outer wall 124, an inner wall 126 spaced radially inwardly from the outer wall 124 and coaxially about the engine centerline axis 36 to define an annular centerbody plenum 128. The centerbody 122 also includes an upstream facing, radially extending aft wall 130 which is fixedly joined to the first and second domes 64 and 66 at the mid-dome support 100. In the preferred embodiment, the first and second dome inner and outer ends 64b and 66a are sandwiched between the centerbody aft wall 130 and the first and second cowl inner and outer ends 104b and 106a, and the bolts 108 fixedly join together these components. Accordingly, the bolts 108 join both the dome cowl 102 and the centerbody 122 to the first and second domes 64 and 66 at the mid-dome support 100 for providing increased structural rigidity of the first and second domes 64 and 66.

Figure 4:
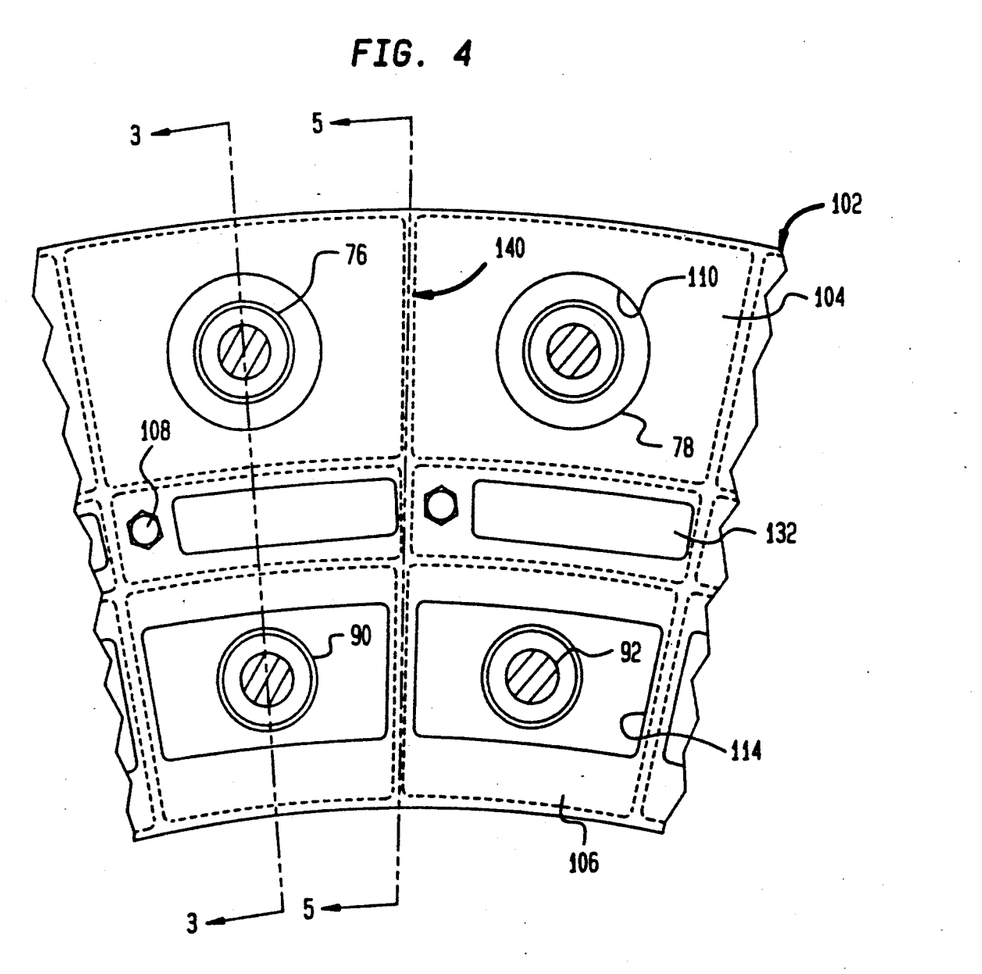
FIG. 4 is a transverse, partly sectional view of a portion of the combustor illustrated in FIG. 3 facing in a downstream direction and taken along line 4—4.

Also in the preferred embodiment, the dome cowl 102 includes a plurality of circumferentially spaced third inlets, or holes 132 disposed circumferentially between the bolts 108 as illustrated more particularly in FIG. 4. The third inlets 132 are also disposed radially between the first and second inlets 110 and 114 for receiving a third portion 50c (see FIG. 3) of the compressed airflow.

Referring again to FIG. 3, the centerbody 122 further includes a plurality of circumferentially spaced inlets 134 disposed in the aft wall 130 for channeling into the centerbody plenum 128 the compressed airflow third portion 50c received from the third inlets 132 through respective transfer ports 136 through the mid-dome support 100 at the first and second dome inner and outer ends 64b and 66a. A plurality of circumferentially spaced outlets 138 are disposed in both the centerbody outer and inner walls 124 and 126 for discharging the compressed airflow third portion 50c into the first and second combustion zones 94 and 96. The centerbody outlets 138 may take the form of any conventional hole for providing film cooling of the centerbody 122, primary combustion air into the first and second combustion zones 94 and 96, and/or dilution air into the first and second combustion zones 94 and 96 in conventional manners.

In the preferred embodiment wherein the centerbody 122 includes the aft wall 130, the centerbody 122 may be simply attached to the mid-dome support 100 by the generally axially extending bolts 108. This allows for relatively easy assembly of the first and second domes 64 and 66, the centerbody 122 and the first and second carburetors 74 and 88. This arrangement also allows the first and second carburetors 74 and 88 to be preferably oriented in the combustor 24 without obstruction by the centerbody 122 and with improved accessibility which would not be possible with radially extending bolts through the centerbody 122.

Accordingly, in the preferred embodiment, the first and second carburetor axial axis 112 and 116 are disposed non-parallel to each other. More specifically, the first carburetor axial axis 112 is disposed generally parallel to the engine centerline axis 36 and the combustor outer liner 58 for channeling the first fuel/air mixture 118 in a generally axial downstream direction. The combustor inner liner 60 as illustrated in FIGS. 2 and 3, is preferably inclined radially upwardly relative to the engine centerline axis 36 and relative to the combustor outer liner 58, and the second carburetor axial axis 116 is aligned generally parallel to the inner liner 60 for directing the second fuel/air mixture 120 in the second combustion zone 96 toward the first combustion zone 94 for improved exit temperature profile and inner liner life.

The dome cowl first, second, and third inlets 110, 114, and 132 are preferably configured and sized for channeling preferred amounts of the compressed airflow first, second and third portions 50a, 50b, and 50c, respectively, thereto. For example, in the preferred embodiment, for maximizing the amount of the compressed airflow portions 50a, 50b, and 50c channeled to the respective inlets while maintaining structural rigidity of the dome cowl 102, the first inlets 110 are preferably circular, and the second and third inlets 114 and 132 are preferably rectangular with their longer dimension extending in the circumferential direction. Furthermore, the first, second, and third inlets 110, 114, and 132 preferably face the diffuser 56 and are aligned therewith for directly receiving the compressed airflow first, second, and third portions 50a, 50b, and 50c, respectively. Inasmuch as the first and second cowls 104 and 106 are generally convex, they provide increased structural rigidity as well as providing preferred arcuate boundaries for channeling a fourth portion 50d of the compressed airflow 50 aerodynamically smoothly around the dome cowl 102 and over the outer surfaces of both liners 58 and 60 for providing cooling thereof.

Figure 5:
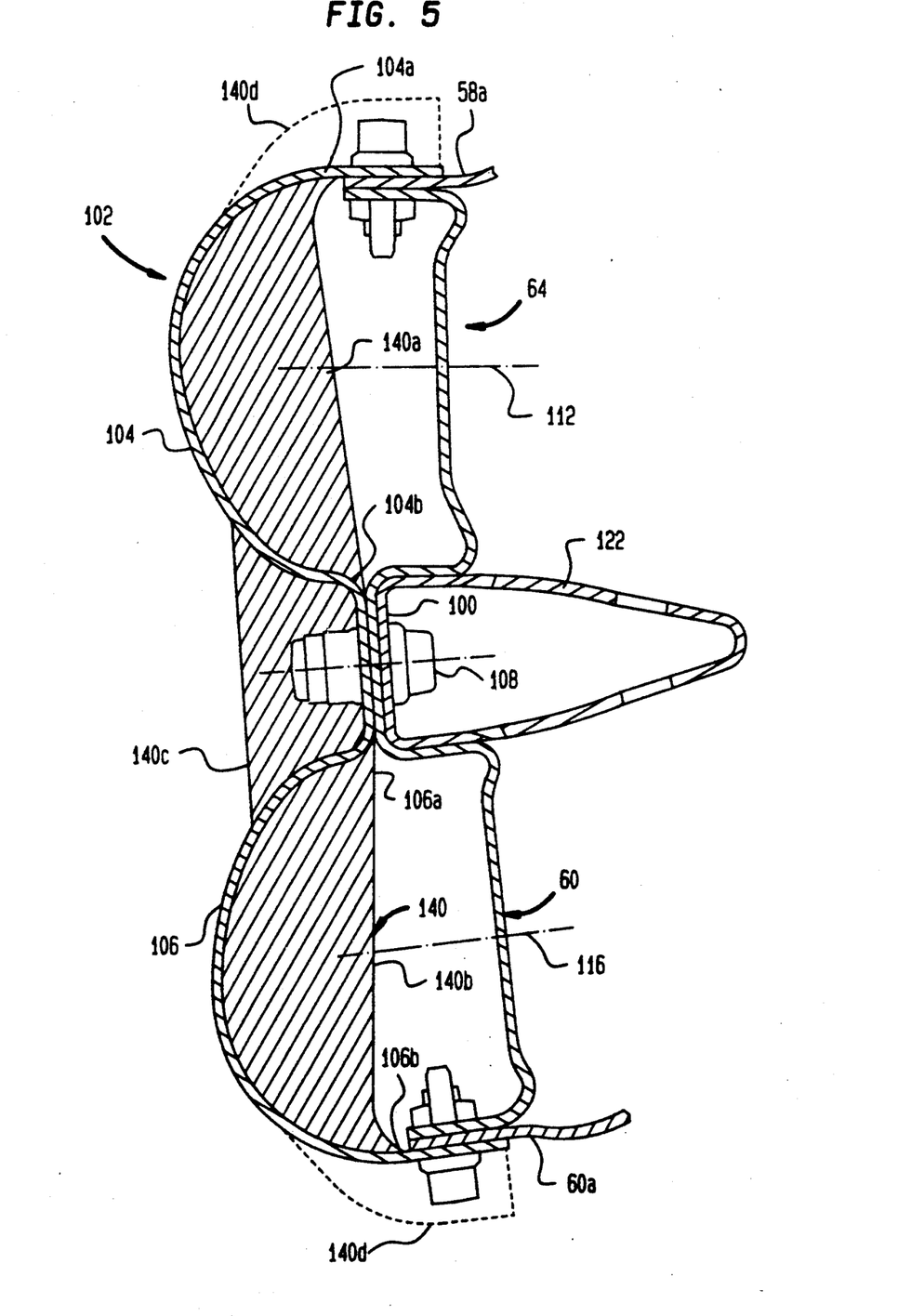
FIG. 5 is a longitudinal sectional view of the combustor portion illustrated in FIG. 4 taken along line 5—5 through a dome cowl structural strut.
Figure 6:
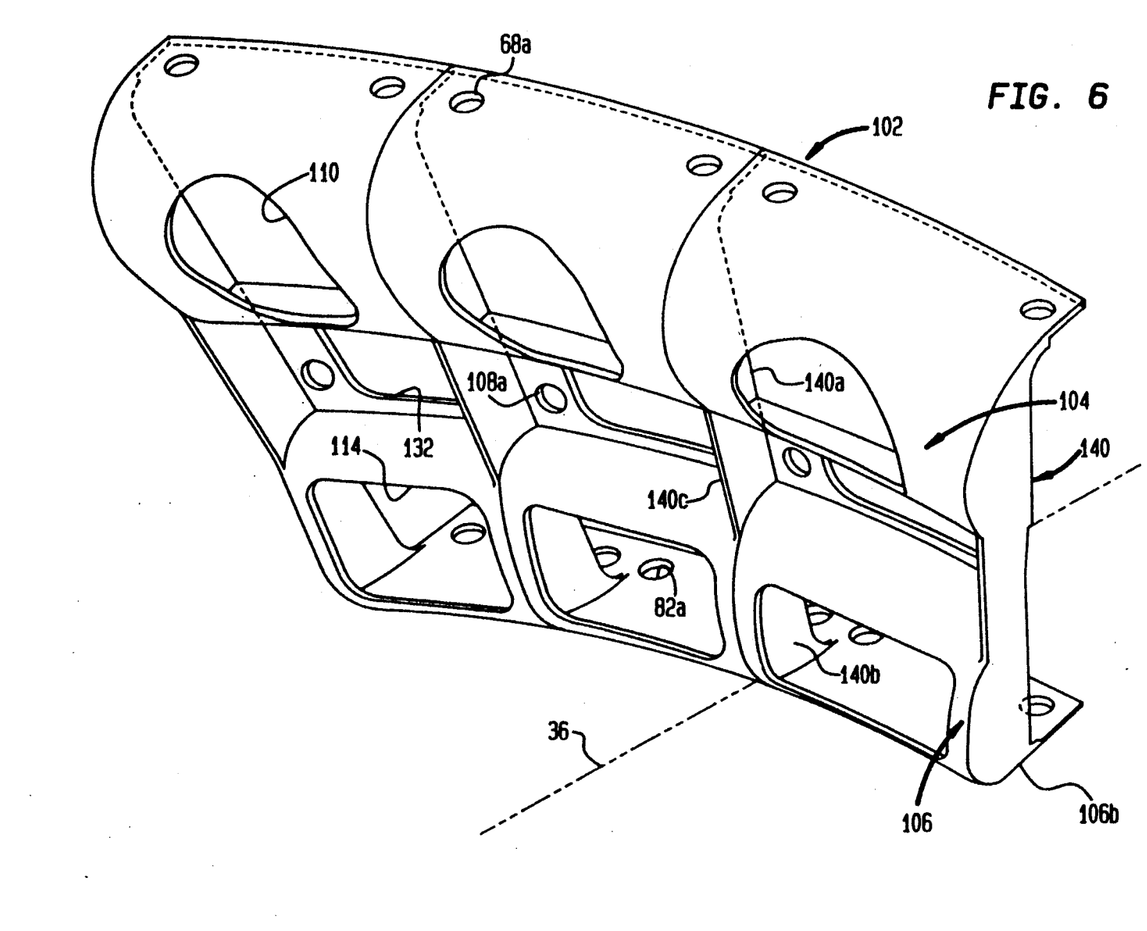
FIG. 6 is a perspective view of a portion of the dome cowl illustrated in FIG. 3.

As illustrated in FIGS. 4, 5, and 6, the joining means 98 including the dome cowl 102 preferably further includes a plurality of circumferentially spaced, radially extending struts or webs 140 fixedly joined to the first and second cowls 104 and 106. More specifically, each of the struts 140 includes a first portion 140a extending downstream from the first cowl 104 and between the first cowl outer and inner ends 104a and 104b. A strut second portion 140b extends downstream from the second cowl 106 and between the second cowl outer and inner ends 106a and 106b. A strut third portion 140c extends upstream from the mid-dome support 100 and between the first and second cowls 104 and 106. The strut first, second, and third portions 140a, 140b, and 140c are preferably formed colinearly with each other and integral with the dome cowl 102 as an integral cast member.

The struts 140 are relatively thin in the circumferential direction and relatively wide in the longitudinal axial direction for providing increased moment of inertia of the dome cowl 102, and therefore, increased structural rigidity in the longitudinal plane for assisting in accommodating the pressure force $F_p$. For alternate embodiments of the present invention requiring yet further increased structural rigidity for the first and second domes 64 and 66, optional strut extensions 140d shown in dashed line in FIG. 5 may be provided to extend radially outwardly and inwardly from the first and second cowls 104 and 106, respectively.

FIG. 6 illustrates solely a portion of the dome cowl 102 removed from adjacent components. In the preferred form of an integral cast member, the dome cowl 102 including the struts 140 is a single unitary piece providing for easy assembly to the outer and inner liners 58 and 60, and the first and second domes 64 and 66. The dome cowl 102 may be a single 360° member, or two 180° members suitably fixedly joined together, or even more arcuate portions. In all cases, however, it is preferred that the first and second cowls 104 and 106, and the struts 140 be formed in the longitudinal plane as a unitary member.

The dome cowl 102 includes complementary holes 68a, 82a, and 108a, for receiving the bolts 68, 82, and 108, respectively. As shown in FIG. 6, the first and second inlets 110 and 114 are radially aligned with each other for receiving a corresponding fuel stem 80 and first and second fuel injectors 78 and 92 (not shown). The third inlets 132 are also generally radially aligned with the first and second inlets 110 and 114; with the first, second, and third inlets 110, 114, and 132 being separated from adjacent ones thereof by the struts 140. The arcuate profile of the first cowl outer end 104a and the second cowl inner end 106b provides an aerodynamically smooth contour for the compressed airflow fourth portions 50d. And, the aft facing surfaces of the first and second cowls 104 and 106 from the first and second inlets 110 and 114 converge relative to each other for smoothly channeling the compressed airflow third portion 50c into the third inlets 132.

Figure 7:
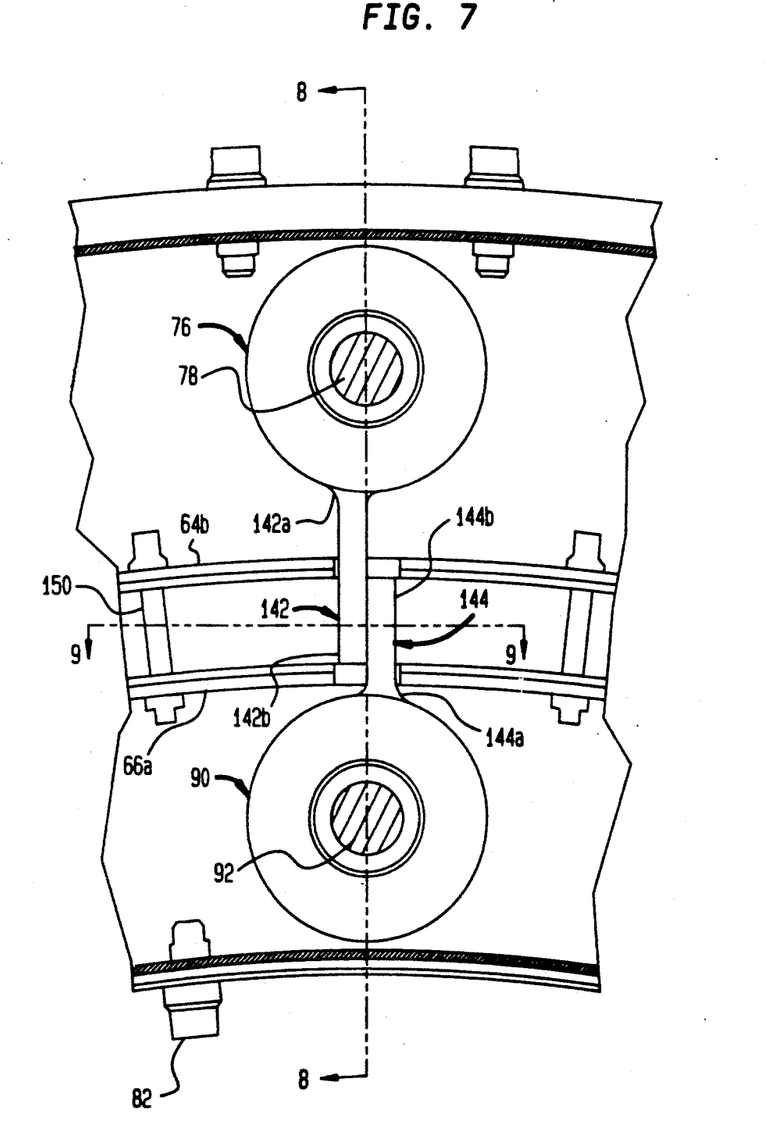
FIG. 7 is an aft facing, partly sectional transverse view of a combustor in accordance with a second embodiment of the present invention taken along line 7—7 of FIG. 8.
Figure 8:
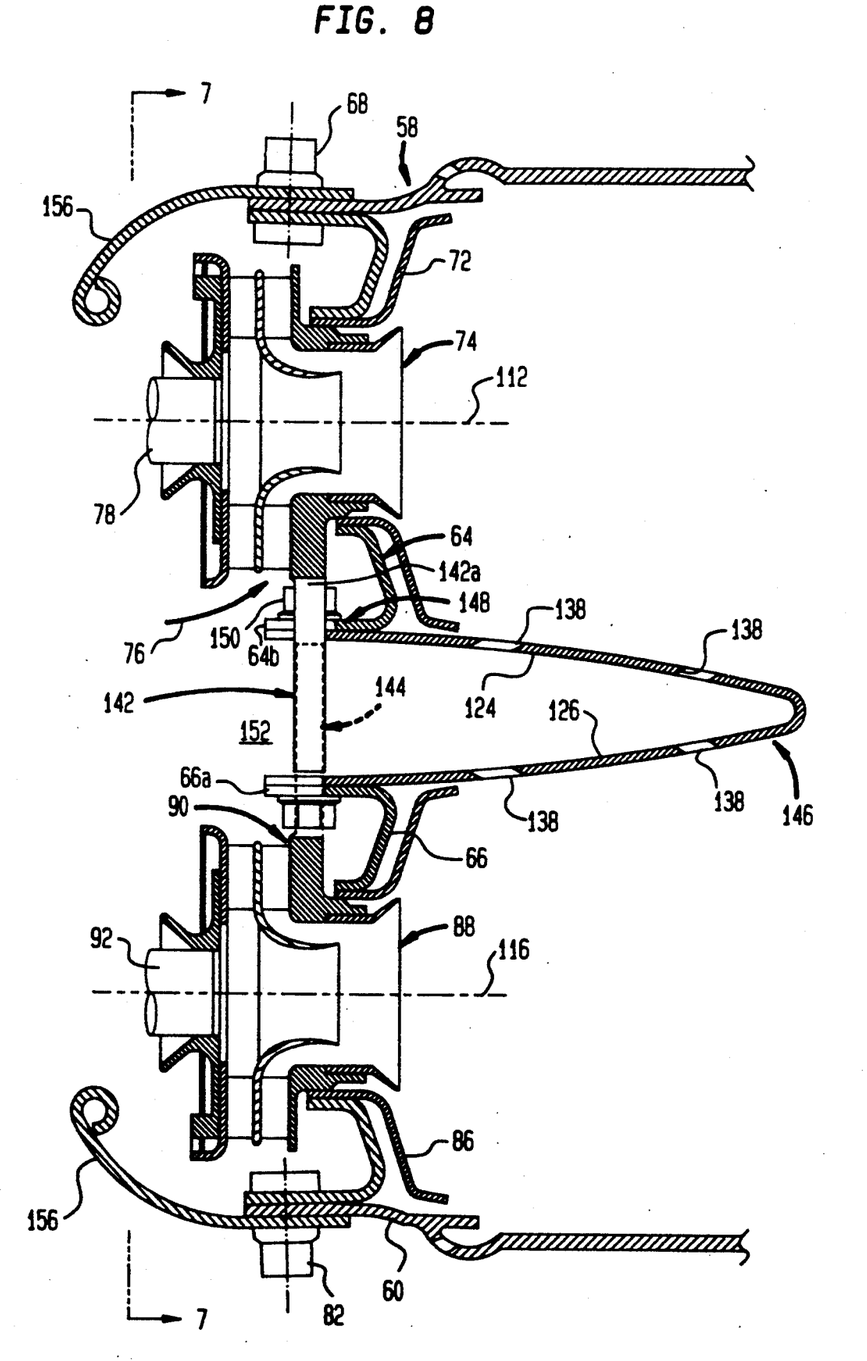
FIG. 8 is a longitudinal sectional view of a portion of the second embodiment of the present invention illustrated in FIG. 7 taken along line 8—8.
Figure 9:
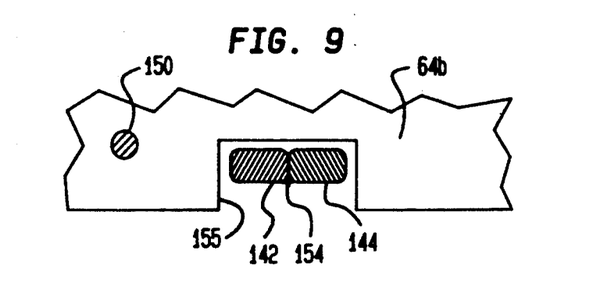
FIG. 9 is a radial, partly sectional view of a portion of the combustor illustrated in FIG. 7 taken along line 9—9.

FIGS. 7-9 illustrate a second, alternate embodiment of the present invention. For ease of description, the same reference numerals are used in the second embodiment illustrated in FIGS. 7-9 for substantially identical elements corresponding to the first embodiment described above. In this second embodiment, a radially inwardly extending first support rod 142 has a proximal end 142a fixedly joined to the conventional first swirler 76, and also includes a distal end 142b. A radially outwardly extending second support rod 144 includes a proximal end 144a fixedly joined to the conventional second swirler 90, and also includes a distal end 144b. The first and second support rods 142 and 144 are preferably integrally cast with the first and second swirlers 76 and 90, respectively.

In this embodiment, an annular generally U-shaped centerbody 146 is fixedly joined to the first and second domes 64 and 66 at its mid-dome support 148. More specifically, the mid-dome support 148 is defined by the centerbody outer wall 124 being fixedly joined at its upstream end to the first dome inner end 64b, and the centerbody inner wall 126 being fixedly joined at its upstream end to the second dome outer end 66a by a plurality of circumferentially spaced radially extending bolts 150. The centerbody 146 also includes an aft facing annular inlet 152 for receiving the compressed airflow third portion 50c.

Also in this embodiment, the joining means first structural path includes the first and second dome inner and outer ends 64b and 66a, respectively, being joined to each other through the centerbody 146 and by the bolts 150. A second structural path for joining the first and second domes 64 and 66 includes the first and second support rods 142 and 144 being fixedly joined to each other at their distal ends 142b and 144b, respectively, by brazing which deposits a braze material 154, as illustrated in FIG. 9, between the first and second support rods 142 and 144. Since the first and second swirlers 76 and 90 are also brazed to the first and second baffles 72 and 86, which are in turn brazed to the first and second domes 64 and 66, the first and second rods 142 and 144 provide a second structural path for transferring the loads from the pressure force $F_p$ through the first and second domes 64 and 66 to the outer and inner liners 58 and 60.

In this embodiment, the upstream ends of the centerbody 146 include a plurality of circumferentially spaced, generally U-shaped recesses 155 in the circumferential direction which receive respective pairs of the first and second rods 142 and 144, as shown in FIG. 9. This allows the first and second rods 142 and 144 to move freely both axially upstream and radially relative to the centerbody 146 for accommodating differential thermal movements therebetween.

Note, that in this embodiment of the invention, the bolts 150 extend in a radial direction, and therefore require that suitable access is maintained between the first and second carburetors 74 and 88 for assembling the centerbody 146 to the first and second domes 64 and 66. In this embodiment, the first and second carburetor centerline axii 112 and 116 are disposed generally parallel to each. Note also that in this embodiment, two conventional annular sheet metal cowls 156 are joined to the outer and inner liners 58 and 60, respectively, by the bolts 68 and 82, respectively. These cowls 156 do not provide a load carrying path between the first and second domes 64 and 66.

Figure 10:
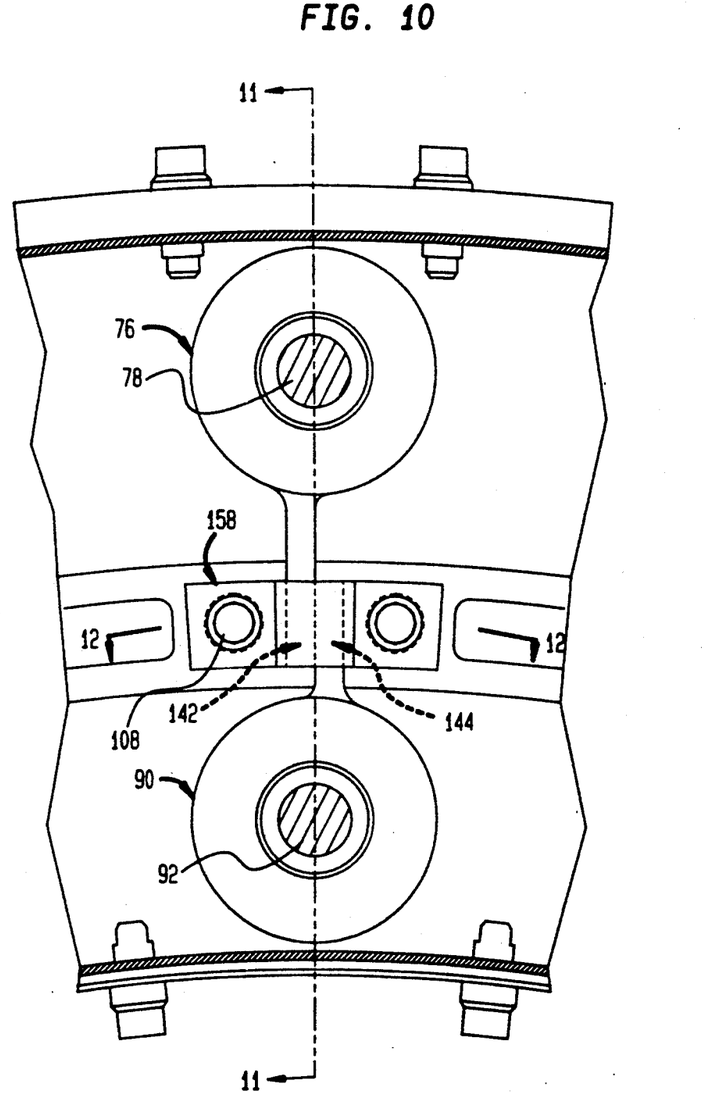
FIG. 10 is an aft facing, partly sectional transverse view of a third embodiment of the present invention taken along line 10—10 of FIG. 11.
Figure 11:
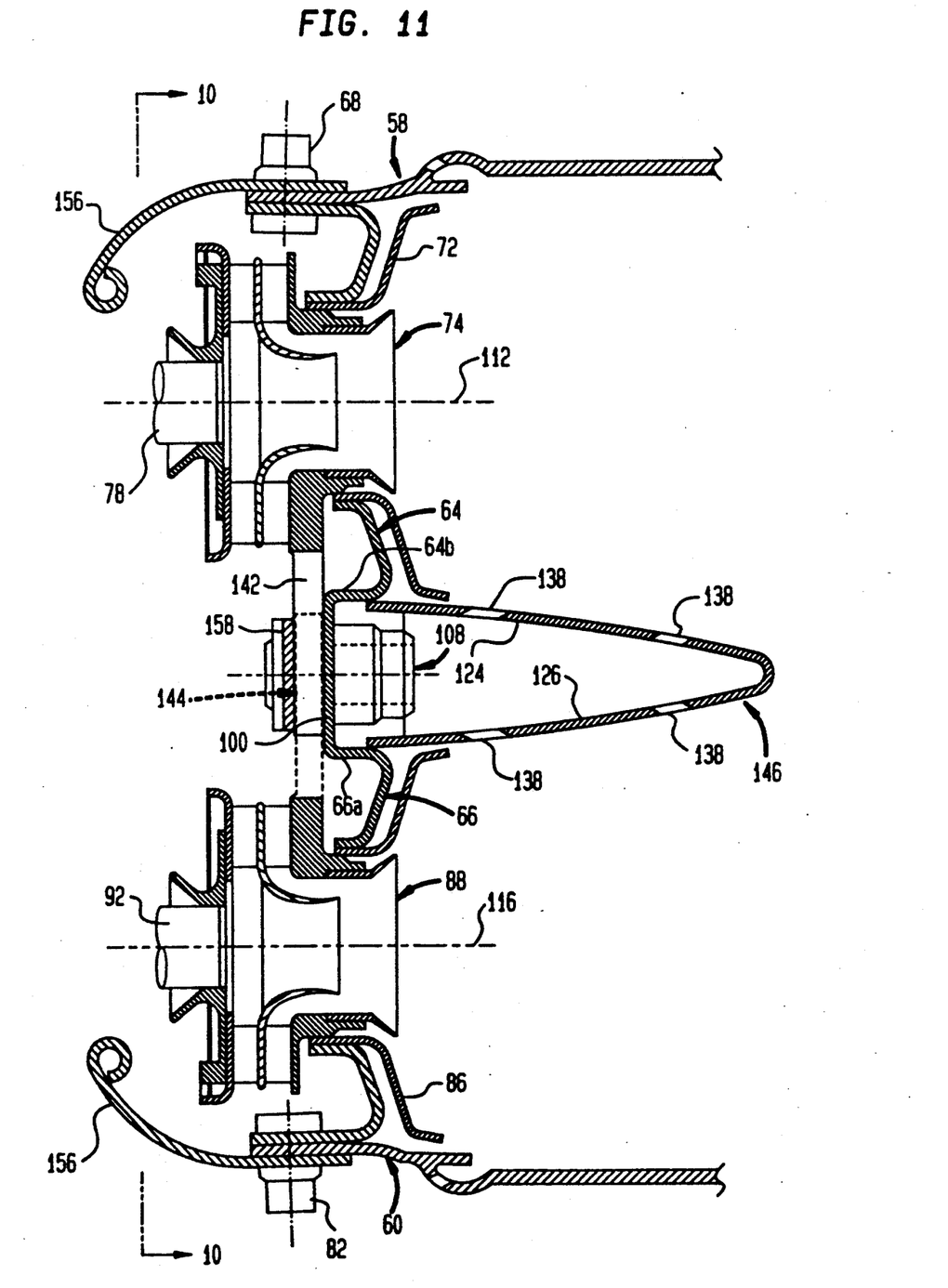
FIG. 11 is a longitudinal sectional view of the third embodiment of the invention as illustrated in FIG. 10 taken along line 11—11.
Figure 12:
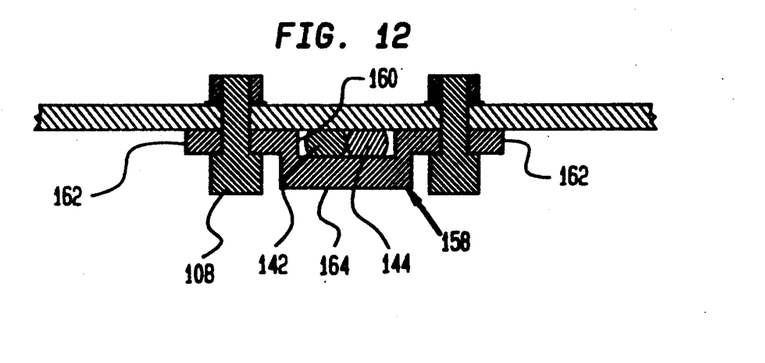
FIG. 12 is a radial, transverse sectional view of a portion of the third embodiment of the present invention illustrated in FIG. 10 taken along line 12—12.

Illustrated in FIGS. 10–12 is another, third, embodiment of the present invention which is generally similar to the second embodiment illustrated in FIGS. 7-9 except that a centerbody, such as centerbody 122 described above is utilized and the first and second rods 142 and 144 are again brazed to each other and are positioned for moving freely radially relative to the centerbody 122 while being constrained from moving axially relative to the centerbody 122. This may be accomplished by providing a plurality of circumferentially spaced support brackets 158 fixedly joined to the first and second domes 64 and 66 and the centerbody 122 at the mid-dome support 100. Each bracket 158 includes a circumferentially extending recess 160 defined by two spaced flanges 162 and an offset aft wall 164 formed integrally therewith. Each of the brackets 158 is fixedly joined to the mid-dome support 100 by a pair of the bolts 108 for axially capturing the first and second support rods 142 and 144 in the recess 160. The clearances between the support rods 142 and 144 and the bracket recess 160 are predeterminedly small to allow the rods 142 and 144 to move relatively freely in the radial direction while constraining movement thereof in the axial direction. Note also in this embodiment, that the conventional sheet metal cowls 156 are also utilized.

In the two alternate embodiments of the invention illustrated in FIGS. 7 and 10, the support rods 142 and 144 provide an additional structural path between the first and second domes 64 and 66 for increasing the structural rigidity thereof. However, the first, and preferred embodiment of the invention illustrated in FIG. 3, for example, uses conventional carburetors 74 and 88 with the new dome cowl 102 for providing additional structural rigidity to the first and second domes 64 and 66 which is greater than that which can be provided by the embodiments illustrated in FIGS. 7 and 10.

The FIG. 3 embodiment is also relatively simple and may utilize a unitary dome cowl 102. Alternatively, the dome cowl 102 may be formed in circumferential segments as described above, such as 180° segments which are suitably joined to each other. The use of the axially disposed bolts 108 in the preferred embodiment allows for an improvement in assembly of the components and allows for the preferential orientation of the first and second carburetors 74 and 88 as described above. Various degrees of additional structural rigidity may be provided in the first embodiment described above by using some or all of the preferred elements thereof. The dome cowl 102 alone provides increased structural rigidity by increasing the bending moment of inertia of the cowl-dome assembly, which is increased even with relatively thin walls (t) of the dome cowl 102. The dome cowl 102 is preferably a cast member and therefore its thickness may be relatively easily increased for providing additional structural rigidity. At least one, or all of the strut portions may be used e.g. 140a, 140b, and/or 140c, as well as the optional strut extension 140d for providing various levels of increased structural rigidity of the cowl-dome assembly. And, furthermore, the centerbody 122 may also be bolted to the dome cowl 102 as described above for providing a further increase in structural rigidity of the dome-cowl assembly.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. For a gas turbine engine having a compressor providing compressed airflow, a double annular combustor comprising:
   an outer liner;
   an inner liner spaced from said outer liner;
   an outer annular combustor including;
   a first dome having an outer end fixedly joined to said outer liner, an inner end spaced from said outer end, and a plurality of circumferentially spaced first holes disposed therein;
   an inner annular combustor including;
   a second dome spaced from said first dome and having an outer end, an inner end spaced from said second dome outer end and fixedly joined to said inner liner, and a plurality of circumferentially spaced second holes disposed therein;
   said outer and inner liners defining therebetween first and second combustion zones disposed downstream of said first and second domes, respectively; and
   means for joining together said first dome and said second dome by two load transmitting structural paths for providing rigidity of said first and second domes for accommodating pressure loading from said compressed airflow.

2. A combustor according to claim 1 wherein said joining means comprises:
   a first structural path including said first dome inner end being fixedly connected to said second dome outer end to define a mid-dome support; and
   a second structural path spaced at least in part from said first structural path and fixedly joining said first dome to said second dome.

3. A combustor according to claim 2 wherein said joining means second structural path comprises an annular dome cowl including:
   an annular first cowl disposed upstream of said first dome, and having an outer end fixedly joined to said first dome outer end, and an inner end spaced from said first cowl outer end and fixedly joined to said mid-dome support;
   an annular second cowl disposed upstream of said second dome, and having an outer end fixedly joined to said mid-dome support, and an inner end spaced from said second cowl outer end and fixedly joined to said second dome inner end.

4. A combustor according to claim 3 wherein each of said first and second cowls is generally arcuate in longitudinal section.

5. A combustor according to claim 4 wherein each of said first and second cowls is convex in an upstream facing direction.

6. A combustor according to claim 4 wherein said dome cowl is an integral cast member.

7. A combustor according to claim 4 wherein:
   said first cowl includes a plurality of circumferentially spaced first inlets for receiving a first portion of said compressed airflow, each aligned axially with a respective one of said first dome holes to define a first axial axis;
   said second cowl includes a plurality of circumferentially spaced second inlets for receiving a second portion of said compressed airflow, each aligned axially with a respective one of said second dome holes to define a second axial axis.

8. A combustor according to claim 7 further including:
   a plurality of first carburetors each disposed in a respective one of said first dome holes coaxially with said first axial axis for receiving said compressed airflow first portion and providing a first fuel/air mixture into said first combustion zone; and
   a plurality of second carburetors each disposed in a respective one of said second dome holes coaxially aligned with said second axial axis for receiving said compressed airflow second portion and providing a second fuel/air mixture into said second combustion zone.

9. A combustor according to claim 8 wherein said dome cowl further includes a plurality of circumferentially spaced radially extending struts fixedly joined to said first and second cowls.

10. A combustor according to claim 8 wherein said joining means further includes an annular centerbody fixedly joined to said first and second domes at said mid-dome support.

11. A combustor according to claim 10 wherein said centerbody is hollow and includes an outer wall, an inner wall spaced from said outer wall to define a centerbody plenum, and an upstream facing, radially extending aft wall fixedly joined to said first and second domes at said mid-dome support.

12. A combustor according to claim 11 wherein said dome cowl further includes a plurality of circumferentially spaced third inlets disposed radially between said first and second inlets for receiving a third portion of said compressed airflow; and
   said centerbody further includes:
   a plurality of circumferentially spaced inlets disposed in said aft wall for channeling into said centerbody plenum said compressed airflow third portion; and
   a plurality of circumferentially spaced outlets disposed in said centerbody inner and outer walls for discharging said compressed airflow third portion into said first and second combustion zones.

13. A combustor according to claim 12 wherein said first and second axial axis are non-parallel to each other.

14. A combustor according to claim 12 wherein said combustor inner liner is inclined relative to said combustor outer liner, and said second axial axis is aligned generally parallel to said inner liner for directing said second fuel/air mixture in said second combustion zone toward said first combustion zone.

15. A combustor according to claim 12 wherein said dome cowl first inlets are circular, and said dome cowl second and third inlets are rectangular.

16. A combustor according to claim 12 wherein said dome cowl further includes a plurality of circumferentially spaced, radially extending struts fixedly joined to said first and second cowls.

17. A combustor according to claim 16 wherein each of said struts includes:
   a first portion extending downstream from said first cowl and between said first cowl outer and inner ends;
   a second portion extending downstream from said second cowl and between said second cowl outer and inner ends; and
   a third portion extending upstream from said mid-dome support and between said first and second cowls.

18. A combustor according to claim 17 wherein said dome cowl and said struts are an integral cast member.

19. A combustor according to claim 18 wherein said combustor outer and inner liners include downstream ends, and said combustor is supportable solely at said outer and inner liner downstream ends.

20. A combustor according to claim 2 wherein said joining means further comprises:
- a plurality of first carburetors each including a first swirler fixedly joined to said first dome in flow communication with said dome first hole;
- a plurality of second carburetors each including a second swirler fixedly joined to said second dome in flow communication with said dome second hole;
- a radially inwardly extending first rod fixedly joined to said first swirler;
- a radially outwardly extending second rod fixedly joined to said second swirler; and
- said first and second rods being fixedly joined to each other.

21. A combustor according to claim 20 wherein said joining means further includes an annular centerbody fixedly joined to said first and second domes at said mid-dome support.

22. A combustor according to claim 21 wherein:
- said centerbody is generally U-shaped and includes an outer wall fixedly joined to said first dome inner end and an inner wall fixedly joined to said second dome outer end; and
- said first and second rods are positioned for moving freely axially and radially relative to said centerbody.

23. A combustor according to claim 20 wherein said centerbody is hollow and includes an outer wall, an inner wall spaced from said outer wall to define a centerbody plenum, and an upstream facing, radially extending aft wall fixedly joined to said first and second domes at said mid-dome support; and
- said first and second rods are positioned for moving freely radially relative to said centerbody while being constrained form moving axially relative to said centerbody.

24. A combustor according to claim 23 further including a plurality of circumferentially spaced support brackets fixedly joined to said first and second domes and said centerbody at said mid-dome support, each including a recess surrounding distal ends of said first and second rods for axially constraining movement of said first and second rods while allowing radial movement thereof.

* * * * *